United States Patent [19]

Dill

[11] 4,322,306

[45] Mar. 30, 1982

[54] RETARDING ACIDIZING FLUIDS

[75] Inventor: Walter R. Dill, Duncan, Okla.

[73] Assignee: Halliburton Company, Duncan, Okla.

[21] Appl. No.: 920,889

[22] Filed: Jun. 30, 1978

[51] Int. Cl.$^3$ ................................................ C09K 3/00
[52] U.S. Cl. ........................ 252/8.55 C; 252/8.55 R;
    166/282; 166/307; 166/308
[58] Field of Search ................ 252/8.55 C, 8.55 R,
    252/316; 166/307, 308, 282, 283

[56] References Cited

U.S. PATENT DOCUMENTS

| | | | |
|---|---|---|---|
| 3,319,714 | 5/1967 | Knox | 166/42 |
| 3,348,613 | 10/1967 | Irani et al. | 252/8.55 C |
| 3,681,240 | 8/1972 | Fast et al. | 252/8.55 C |
| 3,779,916 | 12/1973 | Crowe | 252/8.55 C |
| 3,799,266 | 3/1974 | Kiel | 166/308 |
| 3,917,536 | 11/1975 | Crowe | 166/307 |
| 3,962,102 | 6/1976 | Crowe | 166/307 |
| 4,101,425 | 7/1978 | Young | 252/8.55 C |
| 4,101,426 | 7/1978 | Maly et al. | 252/8.55 C |
| 4,146,486 | 3/1979 | Hessert et al. | 252/8.55 C |
| 4,191,657 | 3/1980 | Swanson | 252/8.55 C |
| 4,233,165 | 11/1980 | Salathiel et al. | 252/8.55 R |

FOREIGN PATENT DOCUMENTS 1395520  5/1979  United Kingdom .

*Primary Examiner*—Joseph L. Schofer
*Assistant Examiner*—J. L. Barr
*Attorney, Agent, or Firm*—John H. Tregoning; Thomas R. Weaver; C. Clark Dougherty, Jr.

[57] ABSTRACT

Methods of chemically retarding the reaction rates of acidizing fluids on calcareous formations and chemically retarded acidizing compositions are provided.

15 Claims, No Drawings

RETARDING ACIDIZING FLUIDS

Acidizing fluids have been utilized heretofore for carrying out treatments in subterranean oil, gas or water producing formations. Such acidizing fluids have primarily been utilized to increase the productivity of oil and gas from calcareous formations by bringing about the removal of reaction materials from naturally occurring fractures and pore spaces in the formations whereby the sizes thereof are increased. Acidizing fluids have also been utilized to create new fractures in formations with the acid acting to etch the fractures so that they remain open and have a high flow capacity.

The rate at which acidizing fluids react with reactive materials in a formation is a function of various factors including acid concentration, temperature, velocity, the type of reactive materials encountered, etc. Whatever the rate of reaction, the acidizing fluid can be introduced into the formation only a certain distance before it becomes spent. The time required for the acidizing fluid to become spent is referred to herein as "reaction time". In creating new fractures in a formation, if the acidizing fluid is pumped further into the formation after it has become spent, it may extend fractures in the formation, but it will not increase the flow capacities of the extended fractures which may close completely when pressure is relieved. Thus, it is important to extend the reaction time of acidizing fluids so that reactive materials are removed and/or new fractures are etched for as great a distance in the formation from the well bore as possible.

Methods and compositions have been developed and used heretofore whereby the reaction time of acidizing fluids is increased. For example, aqueous acid solutions have been chemically retarded by the addition of oil wetting surface active agents to the aqueous acidizing solutions and/or by pre-treating the formations to be acidized with such oil wetting agents. While the heretofore used oil wetting surface active agents have successfully retarded the reaction rates of aqueous acid solutions, i.e., increased the reaction time thereof in calcareous formations, the retarding ability of such agents decreases with increasing formation temperatures.

In addition to chemically retarded aqueous acid solutions, viscous acidizing fluids have been developed which because of their higher viscosity increase the reaction time of the acid contained in the fluid and facilitate the creation of new fractures. Examples of such viscous acidizing fluids are gelled aqueous acid solutions and oil-acid emulsions of both the oil external and acid external types. While it is desirable that such viscous acidizing fluids also be retarded chemically, the previously used chemicals for retarding aqueous acid solutions have not proven effective in retarding viscous acidizing fluids. Such ineffectiveness is due to incompatibility between the chemical providing the retardation and gelling agents, emulsifiers and/or dispersing agents utilized to form the viscous acidizing fluids.

By the present invention, methods of regarding the reaction rates of aqueous acid solutions on calcareous formations are provided which are more effective at high temperatures than the methods utilized heretofore. Further, methods of chemically retarding the reaction rates of viscous acidizing fluids of the gelled and emulsion types on calcareous formations are provided. Such methods basically comprise the steps of combining with an aqueous acid solution or other acidizing fluid an organic diphosphonate of a primary amine in an effective small amount followed by contacting the calcareous formation with the resulting chemically retarded aqueous acid solution or acidizing fluid. Chemically retarded aqueous acid solutions and viscous acidizing fluids of the gelled and emulsion types are also provided by the present invention. The term "acidizing fluid" is used herein to mean both non-viscous acid solutions and viscous acidizing fluids of the gelled aqueous acid and oil-acid emulsion types.

In accordance with the present invention, an organic diphosphonate of a primary amine is combined with the acidizing fluid to be chemically retarded having the general formula:

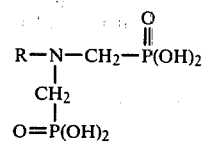

wherein R is an alkyl group having in the range of from about 8 to about 16 carbon atoms. The most preferred organic diphosphonate amine is a compound of the above general formula wherein R is an alkyl group having 12 carbon atoms.

While the above-described organic diphosphonate amine can be combined directly with acidizing fluids the reaction rates of which are to be retarded, because such amines are solid compounds they are preferably dissolved in a solvent which facilitates the dispersal of the amines in the acidizing fluid. Various solvents can be used for this purpose including aqueous low molecular weight alcohol solutions and aqueous low molecular weight organic acid solutions. Most preferably, the organic diphosphonate amine utilized is dissolved in an aqueous acetic acid solution, the acetic acid solution having a concentration and the amine being dissolved therein in an amount whereby the organic diphosphonate amine is present in the solution in an amount of about 44% by weight of the solution and acetic acid is present in the solution in an amount of about 34% by weight of the solution.

When combined with aqueous acid solutions such as aqueous hydrochloric acid solutions or aqueous solutions of mixtures of acids such as hydrochloric acid and formic acid, the organic diphosphonate amine of the present invention effectively retards the reaction rates of such acid solutions over a broad acid concentration range and at temperatures up to and above 350° F. When combined with viscous acidizing fluids of the gelled aqueous acid solution and acid-oil emulsion types, the organic diphosphonate amine effectively retards the reaction rates of such acidizing fluids over broad acid concentration ranges up to temperatures as high as 400° F., and brings about other desired properties such as decreasing friction pressure losses, improving emulsifying properties, and increasing the stability of emulsions. Generally, the organic diphosphonate amine retarder is combined with an acidizing fluid in an amount in the range of from about 0.14% to about 1.8% by weight of the acidizing fluid. The presence of the retarder in the acidizing fluid extends the reaction time of the acidizing fluid upon being introduced into a calcareous formation, and the retarder is compatible with gelling agents, emulsifiers, dispersing agents, corrosion inhibitors and other additives utilized in the acidizing fluids.

As stated above, the organic diphosphonate amine is preferably dissolved in an aqueous acetic acid solution prior to being combined with the acidizing fluid to be retarded, and the aqueous acetic acid-organic diphosphonate amine solution is preferably added to the acidizing fluid in an amount in the range of from about 0.15% to about 2% by volume of the acidizing fluid.

A chemically retarded aqueous acid solution of the present invention is comprised of an aqueous acid solution and an organic diphosphonate of a primary amine having the general formula:

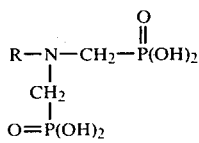

wherein R is an alkyl group having in the range of from about 8 to about 16 carbon atoms. Most preferably, the organic diphosphonate amine has the above general formula and R is an alkyl group having 12 carbon atoms.

Various acids can be utilized in the aqueous acid solution with the preferred acids being selected from the group consisting of hydrochloric acid, formic acid, acetic acid and mixtures of such acids. The acid or mixture of acids utilized is preferably present in the aqueous acid solution in an amount in the range of from about 5% to about 28% by weight of the aqueous acid solution and the organic diphosphonate amine utilized is preferably present in the solution in the amount of about 0.14% to about 1.8% by weight of the solution. Most preferably, the organic diphosphonate amine is dissolved in an aqueous acetic acid solution whereby the solution contains about 44% by weight amine and about 34% by weight acetic acid, such solution being present in the aqueous acid solution the reaction time of which is to be retarded in an amount in the range of from about 0.1% to about 2% by volume of the acid solution.

A particularly preferred chemically retarded aqueous acid solution is comprised of water, hydrochloric acid present in the solution in an amount of from about 15% to about 28% by weight of the solution and the aqueous acetic acid-organic diphosphonate amine solution described above present in the hydrochloric acid solution in an amount in the range of from about 0.15% to about 1% by volume of the hydrochloric acid solution.

Another particularly preferred chemically retarded aqueous acid solution is comprised of water, hydrochloric acid present in the solution in an amount of about 7.5% by weight of the solution, formic acid present in the solution in an amount of about 10% by weight of the solution and the aqueous acetic acid-organic diphosphonate amine solution described above present in the hydrochloric acid-formic acid solution in an amount in the range of from about 0.15% to about 1% by volume of the solution.

A chemically retarded gelled aqueous acid of the present invention is comprised of an aqueous acid solution containing a gelling agent selected from the group consisting of hydratable gums, cellulose derivatives, ethoxylated fatty amines and mixtures of such gelling agents and an organic diphosphonate of a primary amine having the general formula:

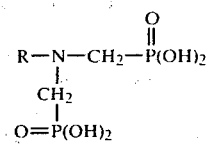

wherein R is an alkyl group having in the range of from about 8 to about 16 carbon atoms.

Examples of hydratable gums which can be utilized are galactomannan gums and derivatives thereof and glucomannan gums and derivatives thereof, such as guar gum, locust bean gum, karaya gum, sodium carboxymethylguar, hydroxyethylguar, sodium carboxymethylhydroxyethylguar and hydroxypropylguar. Examples of cellulose derivatives are sodium carboxymethylhydroxymethylcellulose, sodium carboxymethylhydroxyethylcellulose and hydroxyethylcellulose. An example of an ethoxylated fatty amine gelling agent is a solution of a water soluble organic solvent and an ethoxylated fatty amine having the general formula:

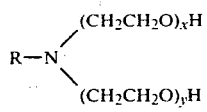

wherein R is selected from saturated and unsaturated aliphatic groups having in the range of from about 8 to about 22 carbon atoms and mixtures thereof, and x and y each have a value in the range of from about 0 to about 10.

Various acids can be utilized in the gelled aqueous acid solutions, the most preferred being selected from the group consisting of hydrochloric acid, formic acid, acetic acid and mixtures of such acids. Preferably, the acid or acids utilized are present in the aqueous acid solution in an amount in the range of from about 5% to about 8 to about 16 carbon atoms.

In preparing the chemically retarded gelled aqueous acid solution of this invention, the organic diphosphonate amine is combined with the aqueous acid solution in an amount in the range of from about 0.14% to about 1.8% by weight of the acid solution and the gelling agent used is then combined with the aqueous acid solution. If hydratable gums and/or cellulose derivatives are used as the gelling agents, they are combined with the aqueous acid solution in an amount in the range of from about 0.2% to about 1.0% by weight of the acid solution to increase the viscosity thereof. If an ethoxylated fatty amine gelling agent is used, it is combined with the aqueous acid solution in an amount in the range of from about 1.0% to about 10.0% by weight of the acid solution to increase the viscosity thereof. The resulting high viscosity gelled aqueous acid solution has a substantially increased reaction time on calcareous formations.

A particularly preferred chemically retarded gelled aqueous acid solution of the present invention is comprised of water, hydrochloric acid present in the solution in an amount in the range of from about 5% to about 20% by weight of the solution, hydroxyethylcellulose present in the solution in an amount in the range of from about 0.2% to about 1% by weight of the solution and an organic diphosphonate amine having the formula:

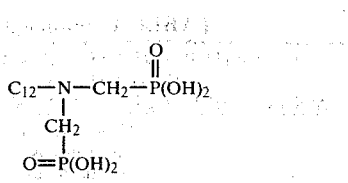

dissolved in an aqueous acid solution whereby the solution contains about 44% by weight amine and 34% by weight acetic acid, the aqueous acetic acid-amine solution being present in the gelled hydrochloric acid solution in an amount in the range of from about 0.15% to about 1% by volume of the solution.

A chemically retarded oil external acid-oil emulsion of the present invention is comprised of an aqueous acid solution, oil, an emulsifier and an organic diphosphonate amine of the type described above. The aqueous acid solution preferably contains an acid selected from the group consisting of hydrochloric acid, formic acid, acetic acid and mixtures of such acids present in the solution in an amount in the range of from about 5% to about 28% by weight of the solution. The aqueous acid solution utilized is present in the acid-oil emulsion in an amount in the range of from about 60% to about 90% by volume of the emulsion.

Various oils can be utilized as the oil phase of the emulsion with an oil selected from the group consisting of kerosene, diesel oil, crude oil and mixtures of such oils being preferred. The oil phase of the emulsion is present therein in an amount in the range of from about 10% to about 40% by volume of the emulsion. An emulsifier selected from the group consisting of nonionic surface active agents, cationic surface active agents and mixtures thereof is present in the emulsion in an amount in the range of from about 0.2% to about 2% by volume of the emulsion. The organic diphosphonate amine is present in the emulsion in the amount of from about 0.1% to about 2% by weight of the emulsion.

The preferred chemically retarded oil external acid-oil emulsion of the present invention is comprised of an aqueous acid solution containing an acid selected from the group consisting of hydrochloric acid, formic acid and mixtures of such acids present in the emulsion in the amount of about 75% by volume of the emulsion, diesel oil present in the emulsion in an amount of about 25% by volume thereof, an emulsifier comprised of a mixture of nonionic and cationic surface active agents present in the emulsion in the amount of about 1% by volume thereof and an organic diphosphonate amine having the formula:

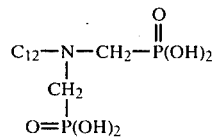

dissolved in an aqueous acetic acid solution, the aqueous acetic acid-organic diphosphonate amine solution being comprised of about 44% by weight organic diphosphonate amine and about 34% by weight acetic acid and being present in the emulsion in the amount in the range of from about 0.15% to about 1% by volume of the emulsion.

In preparing the chemically retarded oil external acid-oil emulsion, the emulsifier used is added to the oil and the components of the aqueous acid solution are added individually to the oil in the order of water, inhibitor, acid or acids, and the aqueous acetic acid-organic diphosphonate amine solution while circulating or agitating the mixture to form the retarded oil external acid-oil emulsion. Such an emulsion is primarily utilized for stimulation of oil producing formations and has a relatively high viscosity.

A chemically retarded acid external acid-oil emulsion of the present invention is comprised of an aqueous acid solution, oil, an emulsifier and an organic diphosphonate amine of the type described herein. Such an emulsion is lower in viscosity than the oil external emulsion described above, and the oil phase may be formed of a volatile hydrocarbon whereby the emulsion can be utilized for stimulating gas wells without leaving nonvolatile liquids in the formation.

The aqueous acid solution utilized preferably contains an acid selected from the group consisting of hydrochloric acid, formic acid, acetic acid and mixtures of such acids present in the aqueous acid solution in an amount in the range of from about 5% to about 28% by weight of the aqueous acid solution. The aqueous acid solution is preferably present in the emulsion in the amount in the range of from about 60% to about 96% by volume of the emulsion.

The oil phase is preferably present in the emulsion in the amount in the range of from about 4% to about 40% by volume and is preferably kerosene, diesel oil, or crude oil if acidizing an oil producing formation, or a volatile hydrocarbon such as toluene, if acidizing a gas producing formation. Toluene, used as the volatile hydrocarbon when treating gas wells, also preferably contains a dispersant such as ethoxylated nonylphenol to provide stability to the emulsion in an amount in the range of from about 4% to about 20% by volume of the toluene phase. The aqueous phase and oil phase are emulsified with an emulsifier such as a nonionic ethyleneoxide derivative of the reaction product of fatty acids and sorbitol, i.e., polyoxyethylene sorbitol hexaoleate. The emulsifier is present in the emulsion in an amount in the range of from about 0.2% to about 2.0% by weight of the emulsion. The organic diphosphonate amine is preferably dissolved in an aqueous acetic acid solution whereby the resulting aqueous acetic acid-organic diphosphonate amine solution contains about 44% by weight organic diphosphonate amine and about 34% by weight acetic acid, the aqueous acetic acid-organic diphosphonate amine solution being present in the emulsion in an amount in the range of from about 0.1% to about 2% by volume of the emulsion.

In preparing the acid external emulsion described above, the hydrocarbon utilized (kerosine, diesel oil, crude oil or toluene containing dispersant) is separately mixed with the emulsifier utilized. The components of the aqueous acid solution (water, inhibitor, acid or acids, aqueous acetic acid-organic diphosphonate amine) are then added in the order listed while circulating or agitating the mixture to obtain a uniform dispersion. Other mixing procedures may be utilized.

The most preferred chemically retarded acid external acid-oil emulsion of this invention is comprised of a 15% by weight aqueous hydrochloric acid solution present in the emulsion in an amount of about 92% by volume of the emulsion, toluene present in an amount of about 8% by volume, polyoxyethylene sorbitol hexaoleate present in an amount of about 0.5% by volume, ethoxylated nonylphenol present in the toluene in an amount of about 14% by volume of toluene and the aqueous acetic acid-organic diphosphonate amine solution described above present in the emulsion in an amount of about 1.0% by volume of the emulsion.

All of the chemically retarded acidizing fluids of the present invention described above preferably include one or more corrosion inhibitors to inhibit corrosion of tubular goods and metallic surfaces contacted by the acidizing fluid such as blends of acetylenic alcohols and amines. Other additives can also be utilized with the acidizing fluids of this invention such as fluid loss additives, friction reducing additives, etc. Because the organic diphosphonate amines described above are compatible with various gelling agents, emulsifiers, dispersing agents, corrosion inhibitors and other additives and effectively increase the reaction time of acidizing fluids at high temperatures on calcareous formations, the methods and acidizing fluids of the present invention achieve superior results in the stimulation of calcareous formations as compared to heretofore used methods and compositions.

In order to more clearly illustrate the methods and compositions of the present invention, the following examples are given.

EXAMPLE 1

In the laboratory, the reaction times of various aqueous hydrochloric acid solutions containing various concentrations of an organic diphosphonate amine are determined. The test procedure comprises placing a quantity of Bedford Limestone into an autoclave. The limestone is heated to a desired temperature (simulating formation temperature) in the presence of kerosene (simulating formation oil). When the autoclave and limestone reach the desired temperature, the kerosene is displaced by a predetermined amount of the aqueous acid solution to be tested at a pressure of 1500 psi. The acid is allowed to react with the rock until it is spent to a residual acid concentration of 3.2% by weight. The quantities of limestone used in the tests are each sized to have a surface area to volume ratio equivalent to that found in a fracture having a width of 0.25 inch. The final acid concentration of 3.2% is used because in most calcareous formations it is the amount of acid required in a 0.25 inch fracture to give the theoretical minimum etching for the desired flow capacity.

The compositions of the various hydrochloric acid solutions tested are given in Table I below. In preparing the compositions containing organic diphosphonate amine, the organic diphosphonate amine is dissolved in an aqueous acetic acid solution whereby the solution contains about 44% by weight organic diphosphonate amine and about 34% by weight acetic acid.

TABLE I

COMPOSITIONS OF TEST RETARDED AND UNRETARDED AQUEOUS HYDROCHLORIC ACID SOLUTIONS

| Solution No. | HCl Concentration, Weight % | Concentration of Aqueous Acetic Acid-Organic Diphosphonate Amine Retarder,[1] Volume % | Concentration of Corrosion Inhibitor,[2] Volume % |
|---|---|---|---|
| 1 | 15 | 0 | 0.3 |
| 2 | 15 | 1.0 | 0.3 |
| 3 | 15 | 0 | 1.0 |
| 4 | 15 | 1.0 | 1.0 |
| 5 | 15 | 0 | 2.0 |
| 6 | 15 | 1.0 | 2.0 |
| 7 | 15 | 2.0 | 2.0 |
| 8 | 20 | 0 | 0.5 |
| 9 | 20 | 1.0 | 0.5 |
| 10 | 20 | 0 | 1.0 |
| 11 | 20 | 1.0 | 1.0 |
| 12 | 20 | 2.0 | 1.0 |
| 13 | 20 | 0 | 2.0 |
| 14 | 20 | 1.0 | 2.0 |
| 15 | 20 | 2.0 | 2.0 |
| 16 | 28 | 0 | 1.0 |
| 17 | 28 | 1.0 | 1.0 |
| 18 | 28 | 0 | 1.0 |
| 19 | 28 | 1.0 | 1.0 |
| 20 | 28 | 2.0 | 1.0 |
| 21 | 28 | 0 | 2.0 |
| 22 | 28 | 1.0 | 2.0 |
| 23 | 28 | 2.0 | 2.0 |

[1] Aqueous Solution Contains 44% by Weight Organic Diphosphonate Amine and 34% by Weight Acetic Acid.
[2] Blend of Acetylenic Alcohols and Amines.

The reaction times for the aqueous hydrochloric acid solutions shown in Table I and determined in accordance with the above described procedure are given in Table II below.

TABLE II

REACTION TIMES OF AQUEOUS HYDROCHLORIC ACID SOLUTIONS WITH BEDFORD LIMESTONE

| Solution No. | Reaction Time (Minutes) | | | |
|---|---|---|---|---|
| | 200° F. | 250° F. | 300° F. | 350° F. |
| 1 | 16 | — | — | — |
| 2 | 400 | — | — | — |
| 3 | — | 13 | — | — |
| 4 | — | 240 | — | — |
| 5 | — | — | 11 | 8 |
| 6 | — | — | 65 | — |
| 7 | — | — | 70 | 22 |
| 8 | 19 | — | — | — |
| 9 | 210 | — | — | — |
| 10 | — | 17 | — | — |
| 11 | — | 110 | — | — |
| 12 | — | 135 | — | — |
| 13 | — | — | 19 | — |
| 14 | — | — | 38 | — |
| 15 | — | — | 40 | — |
| 16 | 25 | — | — | — |
| 17 | 90 | — | — | — |
| 18 | — | 22 | — | — |
| 19 | — | 86 | — | — |
| 20 | — | 86 | — | — |
| 21 | — | — | 31 | — |
| 22 | — | — | 40 | — |
| 23 | — | — | 40 | — |

From Table II it can be seen that aqueous hydrochloric acid solutions containing organic diphosphonate amine have appreciably greater reaction times at high temperatures than such solutions without the amine.

EXAMPLE 2

Oil external acid-oil emulsions are prepared in the laboratory using aqueous hydrochloric acid solutions of various concentrations and 24% by volume kerosene with and without various quantities of the aqueous acetic acid-organic diphosphonate amine solution described in Example 1 above. The emulsions are each prepared by combining an emulsifier comprised of a blend of nonionic and cationic surface active agents with the kerosene. The individual components of the aqueous hydrochloric acid solution (water, inhibitor, hydrochloric acid, aqueous acetic acid amine solution) are then combined with the kerosene in the order listed while agitating the mixture to form the oil external acid-oil emulsion. The various oil external emulsions prepared are shown in Table III below.

TABLE III
COMPOSITIONS OF TEST OIL EXTERNAL HYDROCHLORIC ACID-OIL EMULSIONS

| Solution No. | HCl Concentration in Aqueous HCl Solution Used, Weight % | Concentration of Aqueous Acetic Acid-Organic Diphosphonate Amine Retarder,[1] Volume % | Concentration of Corrosion Inhibitor,[2] Volume % |
|---|---|---|---|
| 1 | 15 | 0 | 0.3 |
| 2 | 15 | 0.5 | 0.3 |
| 3 | 15 | 1.0 | 0.3 |
| 4 | 15 | 0 | 0.5 |
| 5 | 15 | .5 | 0.5 |
| 6 | 15 | 1.0 | 0.5 |
| 7 | 20 | 0 | 0.3 |
| 8 | 20 | 0.5 | 0.3 |
| 9 | 20 | 1.0 | 0.3 |
| 10 | 20 | 0 | 0.5 |
| 11 | 20 | 0.5 | 0.5 |
| 12 | 20 | 1.0 | 0.5 |
| 13 | 28 | 0 | 0.3 |
| 14 | 28 | 0.5 | 0.3 |
| 15 | 28 | 1.0 | 0.3 |
| 16 | 28 | 0 | 0.5 |
| 17 | 28 | 0.5 | 0.5 |
| 18 | 28 | 1.0 | 0.5 |

[1]Aqueous Solution Contains 44% by Weight Organic Diphosphonate Amine and 34% by Weight Acetic Acid
[2]Blend of Acetylenic Alcohols and Amines.

The reaction times of the various emulsions with Bedford Limestone are determined in accordance with the procedure described in Example 1 above with the exception that the free oil surrounding the limestone core is removed prior to the reaction. The results of these tests are shown in Table IV below.

TABLE IV
REACTION TIMES OF OIL EXTERNAL HYDROCHLORIC ACID-OIL EMULSIONS WITH BEDFORD LIMESTONE

| Solution No. | Reaction Times (Minutes) | | |
|---|---|---|---|
| | 200° F. | 250° F. | 300° F. |
| 1 | 68 | — | — |
| 2 | 440 | — | — |
| 3 | 440 | — | — |
| 4 | — | 28 | 11 |
| 5 | — | 130 | — |
| 6 | — | 270 | 65 |
| 7 | 52 | — | — |
| 8 | 205 | — | — |
| 9 | 335 | — | — |
| 10 | — | 28 | 19 |
| 11 | — | 105 | — |
| 12 | — | 220 | 55 |
| 13 | 54 | — | — |
| 14 | 102 | — | — |
| 15 | 240 | — | — |
| 16 | — | 29 | 21 |
| 17 | — | 73 | — |
| 18 | — | 102 | 47 |

From Table IV it can be seen that oil external acid-oil emulsions containing an organic diphosphonate amine have greater reaction times than such emulsions without the amine and that the amine is compatible with the emulsifiers and corrosion inhibotor used.

EXAMPLE 3

Various aqueous acid solutions containing 7.5% by weight hydrochloric acid, 10% by weight formic acid and various concentrations of corrosion inhibitor with and without an organic diphosphonate amine are prepared in the laboratory. Reaction times for the various solutions with Bedford Limestone at various temperatures are determined in accordance with the procedure described in Example 1.

The various solutions tested are given in Table V below.

TABLE V
COMPOSITIONS OF TEST AQUEOUS HYDROCHLORIC ACID-FORMIC ACID SOLUTIONS

| Solution No. | Concentration of Aqueous Acetic Acid-Organic Diphosphonate Amine Retarder,[1] Volume % | Concentration of Corrosion Inhibitor,[2] Volume % |
|---|---|---|
| 1 | 0 | 0.3 |
| 2 | 0.1 | 0.3 |
| 3 | 0.5 | 0.3 |
| 4 | 0.2 | 0.3 |
| 5 | 0.5 | 0.3 |
| 6 | 1.0 | 0.3 |
| 7 | 0.5 | 1.0 |
| 8 | 0.5 | 2.0 |
| 9 | 1.0 | 2.0 |
| 10 | 2.0 | 2.0 |

[1]Aqueous Solution Contains 44% by Weight Organic Diphosphonate Amine and 34% by Weight Acetic Acid
[2]Blend of Acetylenic Alcohols and Amines The reaction times for the solutions tested are given in Table VI below.

TABLE VI
REACTION TIMES OF AQUEOUS HYDROCHLORIC ACID-FORMIC ACID SOLUTIONS WITH BEDFORD LIMESTONE

| Solution No. | Reaction Times (Minutes) | | | | |
|---|---|---|---|---|---|
| | 200° F. | 250° F. | 300° F. | 350° F. | 400° F. |
| 1 | 30 | — | — | — | — |
| 2 | 35 | — | — | — | — |
| 3 | 50 | — | — | — | — |
| 4 | 500 | — | — | — | — |
| 5 | 1400 | — | — | — | — |
| 6 | 1500 | — | — | — | — |
| 7 | — | 400 | — | — | — |
| 8 | — | — | 200 | 100 | — |
| 9 | — | — | 240 | 160 | 100 |
| 10 | — | — | — | 480 | 230 |

From Table VI is can be seen that the reaction times of aqueous hydrochloric acid-formic acid solutions are increased by the presence of an organic diphosphonate amine therein over a broad temperature range.

EXAMPLE 4

Additional aqueous solutions containing 7.5% by weight hydrochloric acid, 10% by weight formic acid, various quantities of corrosion inhibotor and various quantities of the aqueous acetic acid-organic diphosphonate amine solution described in Example 1 above are prepared in the laboratory. Reaction times for the solutions are determined in accordance with the procedure described in Example 1 except that the Bedford Limestone samples are heated in an autoclave pressurized with nitrogen instead of in the presence of kerosene. The purpose of the tests is to determine the effectiveness of the amine as a retarder on limestone which is dry thereby simulating acidizing a gas producing formation where oil is absent.

The compositions of the test aqueous hydrochloric acid-formic acid solutions are given in Table VII and the results of the reaction time tests are given in Table VIII below.

TABLE VII

COMPOSITIONS OF TEST AQUEOUS HYDROCHLORIC ACID-FORMIC ACID SOLUTIONS

| Solution No. | Concentration of Aqueous Acetic Acid-Organic Diphosphonate Amine Retarder,[1] Volume % | Concentration of Corrosion Inhibitor,[2] Volume % |
|---|---|---|
| 1 | 0 | 0.3 |
| 2 | 0.5 | 0.3 |
| 3 | 1.0 | 0.3 |
| 4 | 1.0 | 1.0 |
| 5 | 2.0 | 1.0 |
| 6 | 1.0 | 2.0 |

[1] Aqueous Solution Contains 44% by Weight Organic Diphosphonate Amine and 34% by Weight Acetic Acid
[2] Blend of Acetylenic Alcohols and Amines

TABLE VIII

REACTION TIMES OF AQUEOUS HYDROCHLORIC ACID SOLUTIONS WITH DRY BEDFORD LIMESTONE

| Solution No. | Reaction Times (Minutes) | | | | |
|---|---|---|---|---|---|
| | 200° F. | 250° F. | 300° F. | 350° F. | 400° F. |
| 1 | 23 | — | — | — | — |
| 2 | 33 | — | — | — | — |
| 3 | 50 | — | — | — | — |
| 4 | 70 | 66 | — | — | — |
| 5 | — | 66 | — | — | — |
| 6 | — | — | 60 | 47 | 25 |

From Table VIII it can be seen that the chemically retarded aqueous hydrochloric acid-formic acid solutions of the present invention have increased reaction times with dry limestone as compared to unretarded solutions.

EXAMPLE 5

Oil external acid-oil emulsions are prepared in the laboratory using an aqueous acid solution containing 7.5% by weight hydrochloric acid and 10% by weight formic acid. The emulsions contain 24% by weight kerosene and are each prepared by combining an emulsifier (1.0% by volume of emulsion) comprised of a blend of nonionic and cationic surface active agents with the kerosene and adding the components of the acid phase (water, inhibitor, hydrochloric acid, formic acid, aqueous acetic acid-amine retarder) in the order listed to the kerosene while slowly agitating the mixture to form the retarded oil external acid-oil emulsions. The reaction times of the test emulsions are determined in accordance with the procedure described in Example 1.

The compositions of the test emulsions are shown in Table IX and the reaction times determined are shown in Table X.

TABLE IX

COMPOSITIONS OF TEST OIL EXTERNAL HYDROCHLORIC ACID-FORMIC ACID-OIL EMULSIONS

| Solution No. | Concentration of Aqueous Acetic Acid-Organic Diphosphonate Amine Retarder,[1] Volume % | Concentration of Corrosion Inhibitor,[2] Volume % |
|---|---|---|
| 1 | 0 | 0.3 |
| 2 | 1.0 | 0.3 |
| 3 | 0 | 1.0 |
| 4 | 1.0 | 1.0 |
| 5 | 0 | 1.0 |
| 6 | 1.0 | 1.0 |

[1] Aqueous Solution Contains 44% by Weight Organic Diphosphonate Amine and 34% by Weight Acetic Acid
[2] Blend of Acetylenic Alcohols and Amines

TABLE X

REACTION TIMES OF OIL EXTERNAL HYDROCHLORIC EMULSIONS WITH BEDFORD LIMESTONE

| Solution No. | Reaction Times (Minutes) | | | | |
|---|---|---|---|---|---|
| | 200° F. | 250° F. | 300° F. | 350° F. | 400° F. |
| 1 | 45 | — | — | — | — |
| 2 | 1500 | — | — | — | — |
| 3 | — | 28 | — | — | — |
| 4 | — | 590 | — | — | — |
| 5 | — | — | 20 | 11 | — |
| 6 | — | — | 345 | 240 | 85 |

From Tables IX and X it can be seen that the organic diphosphonate amine effectively increases the reaction times of oil external hydrochloric acid-formic acid-oil emulsions over a broad temperature range.

EXAMPLE 6

Gelled aqueous hydrochloric acid solutions are prepared in the laboratory from aqueous acid solutions containing 15% by weight hydrochloric acid using various gelling agents with and without the aqueous acetic acid-organic diphosphonate amine solution described in Example 1 above. Each of the gelled aqueous acid solutions contains corrosion inhibitor in an amount of 0.3% by volume. The reaction times of the gelled aqueous acid solutions on Bedford Limestone is determined in accordance with the procedure described in Example 1. The results of these tests are shown in Table XI below.

TABLE XI

REACTION TIMES OF GELLED AQUEOUS ACID SOLUTIONS WITH BEDFORD LIMESTONE

| Gelling Agent Used to Form Gelled Aqueous Acid Solution | Quantity of Gelling Agent Used | Concentration of Aqueous Acetic Acid-Organic Diphosphonate Amine Solution, Volume % | Reaction Time at 200° F., Minutes |
|---|---|---|---|
| Guar Gum | 50lbs/1000gal. | 0 | 16 |
| Guar Gum | 50lbs/1000gal. | 0.5 | 87 |
| Hydroxyethylcellulose | 50lbs/1000gal. | 0 | 16 |
| Hydroxyethylcellulose | 50lbs/1000gal. | 0.5 | 280 |

TABLE XI-continued
REACTION TIMES OF GELLED AQUEOUS ACID SOLUTIONS WITH BEDFORD LIMESTONE

| Gelling Agent Used to Form Gelled Aqueous Acid Solution | Quantity of Gelling Agent Used | Concentration of Aqueous Acetic Acid-Organic Diphosphonate Amine Solution, Volume % | Reaction Time at 200° F., Minutes |
|---|---|---|---|
| Ethoxylated Fatty Amine | 4% by Volume | 0 | 16 |
| Ethoxylated Fatty Amine | 4% by Volume | 0.5 | 28 |

From Table XI it can be seen that the chemically retarded gelled aqueous hydrochloric acid solutions have increased reaction times as compared to unretarded gelled aqueous hydrochloric acid solutions.

EXAMPLE 7

Aqueous acetic acid solutions of organic diphosphonate of various primary amines are prepared containing 44% by weight organic diphosphonate amine and 34% by weight acetic acid. The resulting aqueous acetic acid-organic diphosphonate amine solutions are combined with aqueous hydrochloric acid solutions containing 20% by weight hydrochloric acid in amounts of 1% by volume. The resulting compositions are reacted with Bedford Limestone in accordance with the procedure in Example 1 at 200° F. except that the reactions are each continued for reaction times of 90 minutes at the end of which times, the acid concentrations of the spent acid compositions are determined.

The results of these tests are shown in Table XII below.

TABLE XII
RESIDUAL ACID CONCENTRATIONS OF AQUEOUS HYDROCHLORIC ACID SOLUTIONS RETARDED WITH VARIOUS ORGANIC DIPHOSPHONATE AMINES

| Carbon Content of Alkyl Group Of Organic Amine Used | Residual Acid Content After Reaction with Bedford Limestone at 200° F. for 90 Minutes, Weight % |
|---|---|
| 6 | 0.83 |
| 8 | 1.03 |
| 12 | 12.5 |
| 18 | 0.8 |

From Table XII it can be seen that an organic diphosphonate amine having an alkyl group of 12 carbon atoms is the most effective in retarding aqueous hydrochloric acid solutions.

EXAMPLE 8

Acid external emulsions are prepared in the laboratory containing 92% by volume of a 15% by weight aqueous hydrochloric acid solution, 4% or 8% by volume toluene containing ethoxylated nonylphenol dispersant in an amount of 14% by volume of the toluene, various amounts of polyoxyethylene sorbitol hexaoleate emulsifier, various amounts of corrosion inhibitor and various amounts of the aqueous acetic acid-organic diphosphonate amine retarder described in Example 1. The emulsions are prepared by mixing the emulsifier with the toluene containing dispersant. The water, inhibitor, acid and retarder are then individually combined with the toluene-dispersant-emulsifier mixture in the order listed while agitating the mixture.

The reaction times of the test emulsions are determined in accordance with the procedure described in Example 1 except that the Bedford Limestone samples are heated in an autoclave pressurized with nitrogen instead of in the presence of kerosene to simulate a gas producing formation.

The compositions of the test acid external emulsions are given in Table XIII and the results of the reaction time tests are given in Table XIV below.

TABLE XIII
COMPOSITIONS OF TEST ACID EXTERNAL HYDROCHLORIC ACID-TOLUENE EMULSIONS

| Solution No. | Concentration of Aqueous Acetic Acid-Organic Diphosphonate Amine Retarder[1], Volume % | Concentration of Toluene Containing 14% by Volume Ethoxylated Nonylphenol, Volume % | Concentration of Polyoxyethylene Sorbitol Hexaoleate Emulsifier, Volume % | Concentration of Corrosion Inhibitor[2], Volume % |
|---|---|---|---|---|
| 1 | 1.0 | 4.0 | 0.5 | 0.3 |
| 2 | 1.0 | 4.0 | 0.5 | 1.0 |
| 3 | 1.0 | 4.0 | 1.0 | 0.3 |
| 4 | 1.0 | 4.0 | 1.0 | 1.0 |
| 5 | 1.0 | 8.0 | 0.25 | 0.3 |
| 6 | 1.0 | 8.0 | 0.25 | 1.0 |
| 7 | 1.0 | 8.0 | 0.5 | 0.3 |
| 8 | 1.0 | 8.0 | 0.5 | 1.0 |
| 9 | 1.0 | 8.0 | 1.0 | 1.0 |
| 10 | 1.0 | 8.0 | 1.0 | 2.0 |
| 11 | 2.0 | 8.0 | 1.0 | 1.0 |
| 12 | 2.0 | 8.0 | 1.0 | 2.0 |
| 13 | 2.0 | 8.0 | 0.5 | 1.0 |
| 14 | 2.0 | 8.0 | 0.5 | 2.0 |

[1]Aqueous Solution Contains 44% by Weight Organic Diphosphonate Amine and 34% by Weight Acetic Acid.
[2]Blend of Acetylenic Alcohols and Amines.

TABLE XIV
REACTION TIMES OF ACID EXTERNAL HYDROCHLORIC ACID-TOLUENE EMULSIONS WITH BEDFORD LIMESTONE

| Solution No. | Reaction Times (Minutes) | | |
|---|---|---|---|
| | 200° F. | 250° F. | 300° F. |
| 1 | 325+ | — | — |
| 2 | — | 68 | — |
| 3 | 300 | — | — |
| 4 | — | 80 | — |
| 5 | 90 | — | — |
| 6 | — | 65 | — |
| 7 | 90 | — | — |
| 8 | — | 38 | — |
| 9 | — | 85 | — |
| 10 | — | — | 31 |
| 11 | — | 97 | — |
| 12 | — | — | 38 |
| 13 | — | 82 | — |
| 14 | — | — | 36 |

From Tables XIII and XIV it can be seen that long reactions times of acid external emulsions containing organic diphosphonate amine retarder with limestone are obtained over a broad temperature range.

What is claimed is:

1. A chemically retarded aqueous acid solution comprised of water, an acid selected from the group consisting of hydrochloric acid, formic acid, acetic acid and mixtures of such acids and an organic diphosphonate amine having the general formula:

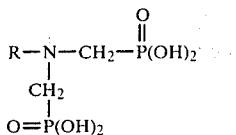

wherein:
R is an alkyl group having in the range of from about 8 to about 16 carbon atoms,
said acid being present in said aqueous acid solution in an amount in the range of from about 5% to about 28% by weight of said solution, and
said organic diphosphonate amine being present in said aqueous acid solution in an amount in the range of from about 0.14% to about 1.8% by weight of said solution.

2. The aqueous acid solution of claim 1 wherein R is an alkyl group having 12 carbon atoms.

3. The aqueous acid solution of claim 2 which is further characterized to include one or more corrosion inhibitors present in said solution in an amount in the range of from about 0.1% to about 2% by volume of said solution.

4. A chemically retarded gelled aqueous acid solution comprised of an aqueous solution of an acid selected from the group consisting of hydrochloric acid, formic acid, acetic acid and mixtures of such acids, a gelling agent selected from the group consisting of hydratable gums, cellulose derivatives and a solution of a water soluble organic solvent and an ethoxylated fatty amine, and an organic disphosphonate amine having the general formula:

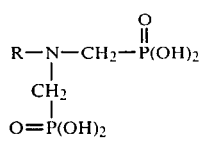

wherein:
R is an alkyl group having in the range of from about 8 to about 16 carbon atoms,
said acid being present in said gelled aqueous acid solution in an amount in the range of from about 5% to about 28% by weight of said solution,
said gelling agent being present in said solution in an amount in the range of from about 0.2% to about 10% by weight of said solution, and
said organic diphosphonate amine being present in said solution in an amount in the range of from about 0.14% to about 1.8% by weight of said solution.

5. The gelled aqueous acid solution of claim 4 wherein R is an alkyl group having 12 carbon atoms.

6. The gelled aqueous acid solution of claim 5 wherein said gelling agent is hydroxyethylcellulose present in said solution in an amount in the range of from about 0.2% to about 1.0% by weight.

7. The gelled aqueous acid solution of claim 6 which is further characterized to include one or more corrosion inhibitors present in said solution in an amount in the range of from about 0.1% to about 2% by volume of said solution.

8. A chemically retarded oil external acid-oil emulsion comprised of an aqueous acid solution containing of an acid selected from the group consisting of hydrochloric acid, formic acid, acetic acid and mixtures of such acids, oil selected from the group consisting of kerosene, diesel oil, crude oil and mixtures of such oils, an emulsifier selected from the group consisting of nonionic surface active agents, cationic surface active agents and mixtures thereof, and an organic disphosphonate amine having the general formula:

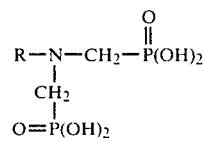

wherein:
R is an alkyl group having in the range of from about 8 to about 16 carbon atoms,
said acid being present in said aqueous acid solution in an amount in the range of from about 5% to about 28% by weight of said solution and said aqueous acid solution being present in said acid-oil emulsion in an amount in the range of from about 60% to about 90% by volume of said emulsion,
said oil being present in said acid-oil emulsion in an amount in the range of from about 10% to about 40% by volume of said emulsion,
said emulsifier being present in said acid-oil emulsion in an amount in the range of from about 0.2% to about 2% by volume of said emulsion, and
said organic diphosphonate amine being present in said acid-oil emulsion in an amount in the range of from about 0.1% to about 2% by weight of said emulsion.

9. The oil external acid-oil emulsion of claim 8 wherein R is an alkyl group having 12 carbon atoms.

10. The oil external acid-oil emulsion of claim 9 which is further characterized to include one or more corrosion inhibitors present in said emulsion in an amount in the range of from about 0.1% to about 2% by volume of said emulsion.

11. A chemically retarded acid external acid-oil emulsion comprised of an aqueous acid solution containing an acid selected from the group consisting of hydrochloric acid, formic acid, acetic acid and mixtures of such acids, oil selected from the group consisting of kerosene, diesel oil, crude oil, toluene, and mixtures thereof, polyoxyethylene sorbitol hexaoleate emulsifier and an organic diphosphate amine having the general formula:

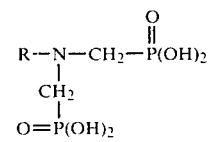

wherein:
R is an alkyl group having in the range of from about 8 to about 16 carbon atoms,
said acid being present in said aqueous acid solution in an amount in the range of from about 5% to about 28% by weight of said aqueous acid solution and said aqueous acid solution being present in said acid external acid-oil emulsion in an amount in the range of from about 60% to about 96% by volume of said emulsion, said oil being present in said emulsion in an amount in the range of from about 4% to about 40% by volume of said emulsion, said emulsifier being present in said emulsion in an amount in the range of from about 0.2% to about 2% by weight of said emulsion, and said organic diphosphonate amine being present in said emulsion in an amount in the range of from about 0.14% to about 1.8% by weight of said emulsion.

12. The acid external acid-oil emulsion of claim 11 wherein R is an alkyl radical having 12 carbon atoms.

13. The acid external acid-oil emulsion of claim 12 wherein said oil is toluene present in said emulsion in an amount in the range of from about 4% to about 40% by volume of said emulsion.

14. The acid external acid-oil emulsion of claim 13 which is further characterized to include ethoxylated nonylphenol present in said emulsion in an amount in the range of from about 4% to about 20% by volume of said toluene present therein.

15. The acid external acid-oil emulsion of claim 14 which is further characterized to include one or more corrosion inhibitors present in said emulsion in an amount in the range of from about 0.1% to about 2.0% by volume of said emulsion.

* * * * *

UNITED STATES PATENT AND TRADEMARK OFFICE
CERTIFICATE OF CORRECTION

PATENT NO. : 4,322,306   "PAGE 1 OF 2"

DATED : March 30, 1982

INVENTOR(S) : DILL, Walter R.

It is certified that error appears in the above—identified patent and that said Letters Patent is hereby corrected as shown below:

Column 1, at line 9, the word "reaction" should read
--reactive--,

Column 4, at line 41, the phrase "8 to about 16 carbon atoms" should read -- 28% by weight of the solution.--, Column 11, at line 42 in Table VIII, the title "Reaction Times of Aqueous Hydrochloric Acid Solutions with Dry Bedford Limestone" should read --Reaction Times of Aqueous Hydrochloric Acid-Formic Acid Solutions with Dry Bedford Limestone--

Column 12, at line 27 in Table X, the title "Reaction Times of Oil External Hydrochloric Emulsions with Bedford Limestone" should read --Reaction Times of Oil External Hydrochloric Acid-Formic Acid-Oil Emulsions with Bedford Limestone--

Column 12, at line 58 in Table XI, the title "Reaction Times of Gelled Aqueous Acid Solutions with Bedford Limestone" should read --Reaction Times of Gelled Aqueous Hydrochloric Acid Solutions with Bedford Limestone--, Column 13, at line 2 in Table XI, the title "Reaction Times of Gelled Aqueous Acid Solutions with Bedford Limestone" should read --Reaction Times of Gelled Aqueous Hydrochloric Acid Solutions with Bedford Limestone--,

UNITED STATES PATENT AND TRADEMARK OFFICE
CERTIFICATE OF CORRECTION

PATENT NO. : 4,322,306          "PAGE 2 OF 2"

DATED : March 30, 1982

INVENTOR(S) : DILL, Walter R.

It is certified that error appears in the above—identified patent and that said Letters Patent is hereby corrected as shown below:

Column 13, at line 29 in Example 7, insert between the words "procedure" and "in" the word --described--

Column 13, at line 43 in Table XII, the title of the first column "Carbon Content of Alkyl Group of Organic Amine Used" should read --Carbon Content of Alkyl Group of Organic Diphosphonate Amine Used--

Signed and Sealed this

Twenty-sixth Day of October 1982

[SEAL]

Attest:

GERALD J. MOSSINGHOFF

Attesting Officer      Commissioner of Patents and Trademarks